United States Patent
Wu

(10) Patent No.: US 10,317,561 B2
(45) Date of Patent: Jun. 11, 2019

(54) ESTIMATION OF THREE-DIMENSIONAL FORMATION USING MULTI-COMPONENT INDUCTION TOOLS

(71) Applicant: Halliburton Energy Services, Inc., Houston, TX (US)

(72) Inventor: Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 425 days.

(21) Appl. No.: 14/420,126

(22) PCT Filed: Nov. 8, 2013

(86) PCT No.: PCT/US2013/069254
§ 371 (c)(1),
(2) Date: Feb. 6, 2015

(87) PCT Pub. No.: WO2015/069282
PCT Pub. Date: May 14, 2015

(65) Prior Publication Data
US 2016/0011327 A1 Jan. 14, 2016

(51) Int. Cl.
*G01V 3/28* (2006.01)
*G01V 3/38* (2006.01)
*G01V 3/30* (2006.01)

(52) U.S. Cl.
CPC .................. *G01V 3/28* (2013.01); *G01V 3/38* (2013.01)

(58) Field of Classification Search
CPC .................................. G01V 3/28; G01V 3/38
USPC .......................................................... 702/7, 8
See application file for complete search history.

(56) References Cited

U.S. PATENT DOCUMENTS

| | | | | |
|---|---|---|---|---|
| 5,453,689 A | * | 9/1995 | Goldfine | G01B 7/105 324/207.17 |
| 5,700,773 A | * | 12/1997 | Jakubicki | C11D 1/83 510/235 |
| 5,703,773 A | * | 12/1997 | Tabarovsky | G01V 3/28 702/11 |
| 6,098,019 A | * | 8/2000 | Hakvoort | G01V 3/20 324/339 |

(Continued)

FOREIGN PATENT DOCUMENTS

| | | |
|---|---|---|
| WO | WO-2013/036509 A1 | 3/2013 |
| WO | WO-2013/036896 A1 | 3/2013 |
| WO | WO-2013116099 A1 | 8/2013 |

OTHER PUBLICATIONS

"European Application Serial No. 13887595.0, Extended European Search Report dated Jul. 11, 2016", 6 pgs.

(Continued)

*Primary Examiner* — Sheikh Maruf
(74) *Attorney, Agent, or Firm* — Gilliam IP PLLC

(57) ABSTRACT

Various embodiments include apparatus and methods to utilize signals acquired from a multi-component induction tool operating in a wellbore. The acquired signals can be correlated to an apparent conductivity of a formation and mapped to components of the apparent conductivity tensor conductivity. A multi-stage inversion scheme can be implemented to determine three-dimensional formation parameters from operating the multi-component induction tool. Additional apparatus, systems, and methods are disclosed.

33 Claims, 6 Drawing Sheets

(56) References Cited

U.S. PATENT DOCUMENTS

| | | | |
|---|---|---|---|
| 6,278,906 B1* | 8/2001 | Piepmeier | B25J 9/1607 700/245 |
| 6,502,036 B2* | 12/2002 | Zhang | G01V 3/28 702/7 |
| 7,236,886 B2 | 6/2007 | Frenkel et al. | |
| 2003/0215786 A1* | 11/2003 | Hill | G06F 19/12 435/4 |
| 2005/0088181 A1* | 4/2005 | Barber | G01V 3/28 324/346 |
| 2006/0095239 A1 | 5/2006 | Frenkel | |
| 2006/0173624 A1* | 8/2006 | Frenkel | G01V 3/265 702/7 |
| 2007/0083330 A1* | 4/2007 | Frenkel | G01V 3/20 702/7 |
| 2008/0319675 A1* | 12/2008 | Sayers | G01V 1/50 702/11 |
| 2009/0187391 A1* | 7/2009 | Wendt | G01V 1/28 703/7 |
| 2009/0240751 A1* | 9/2009 | Renshaw | G06F 3/04895 708/131 |
| 2010/0017171 A1* | 1/2010 | Spilker | G06F 19/3437 703/2 |
| 2010/0312478 A1* | 12/2010 | Tabanou | G01V 11/00 702/7 |
| 2011/0035151 A1* | 2/2011 | Botto | G01V 5/04 702/2 |
| 2011/0231098 A1* | 9/2011 | Omeragic | G01V 3/28 702/7 |
| 2012/0109528 A1* | 5/2012 | Bolshakov | E21B 47/0002 702/9 |
| 2012/0136641 A1* | 5/2012 | Fung | E21B 43/00 703/10 |
| 2012/0215448 A1* | 8/2012 | Hu | G01V 3/28 702/7 |
| 2013/0073206 A1* | 3/2013 | Hou | G01V 3/28 702/7 |
| 2013/0080058 A1* | 3/2013 | Wu | G01V 1/42 702/7 |
| 2013/0126240 A1* | 5/2013 | Johnston | E21B 47/026 175/45 |
| 2013/0141102 A1* | 6/2013 | Donderici | G01V 3/30 324/338 |
| 2014/0032116 A1* | 1/2014 | Guner | G01V 3/30 702/6 |
| 2014/0350859 A1* | 11/2014 | Lin | G01V 3/26 702/7 |
| 2015/0112598 A1* | 4/2015 | Kherroubi | G01V 3/20 702/11 |
| 2015/0276966 A1* | 10/2015 | Wang | G01V 3/38 702/7 |
| 2016/0003963 A1* | 1/2016 | Kouchmeshky | G01V 3/38 702/7 |
| 2016/0003964 A1* | 1/2016 | Celepcikay | G01V 3/38 702/7 |
| 2016/0047239 A1* | 2/2016 | Hou | E21B 47/12 702/7 |
| 2016/0047934 A1* | 2/2016 | Wang | G01V 3/18 702/7 |
| 2016/0054467 A1* | 2/2016 | Li | G01V 3/18 702/7 |
| 2016/0061987 A1* | 3/2016 | Kherroubi | G01V 3/18 702/7 |
| 2016/0084983 A1* | 3/2016 | Wu | G01V 3/108 702/7 |
| 2016/0090835 A1* | 3/2016 | Sethi | E21B 47/0905 324/338 |
| 2016/0124108 A1* | 5/2016 | Wu | G01V 3/38 702/7 |
| 2016/0252648 A1* | 9/2016 | Omeragic | G01V 5/08 702/8 |
| 2018/0142548 A1* | 5/2018 | Donderici | E21B 47/02216 |
| 2018/0246246 A1* | 8/2018 | Fan | G01V 3/18 |
| 2018/0321414 A1* | 11/2018 | Wu | G01V 3/18 |

OTHER PUBLICATIONS

"European Application Serial No. 13887595.0, Office Action dated Jun. 26, 2015", 2 pgs.

"European Application Serial No. 13887595.0, Office Action dated Jul. 28, 2016", 1 pg.

"European Application Serial No. 13887595.0, Reply filed Nov. 12, 2015 to Office Action dated Jun. 26, 2015", 12 pgs.

Hou, Junsheng, et al., "A new multi-frequency triaxial array induction tool for enhancing evaluation of anisotropic formations and its field testing", *SPWLA 54th Annual Logging Symposium*, New Orleans, LA, (Jun. 22-26, 2013), (2013), 1-16.

"International Application Serial No. PCT/US2013/069254, International Search Report dated Jul. 24, 2014", 3 pgs.

"International Application Serial No. PCT/US2013/069254, Written Opinion dated Jul. 24, 2014", 12 pgs.

GCC Application Serial No. 2014/28275; Examination Report; Dec. 10, 2018, 4 pages.

* cited by examiner

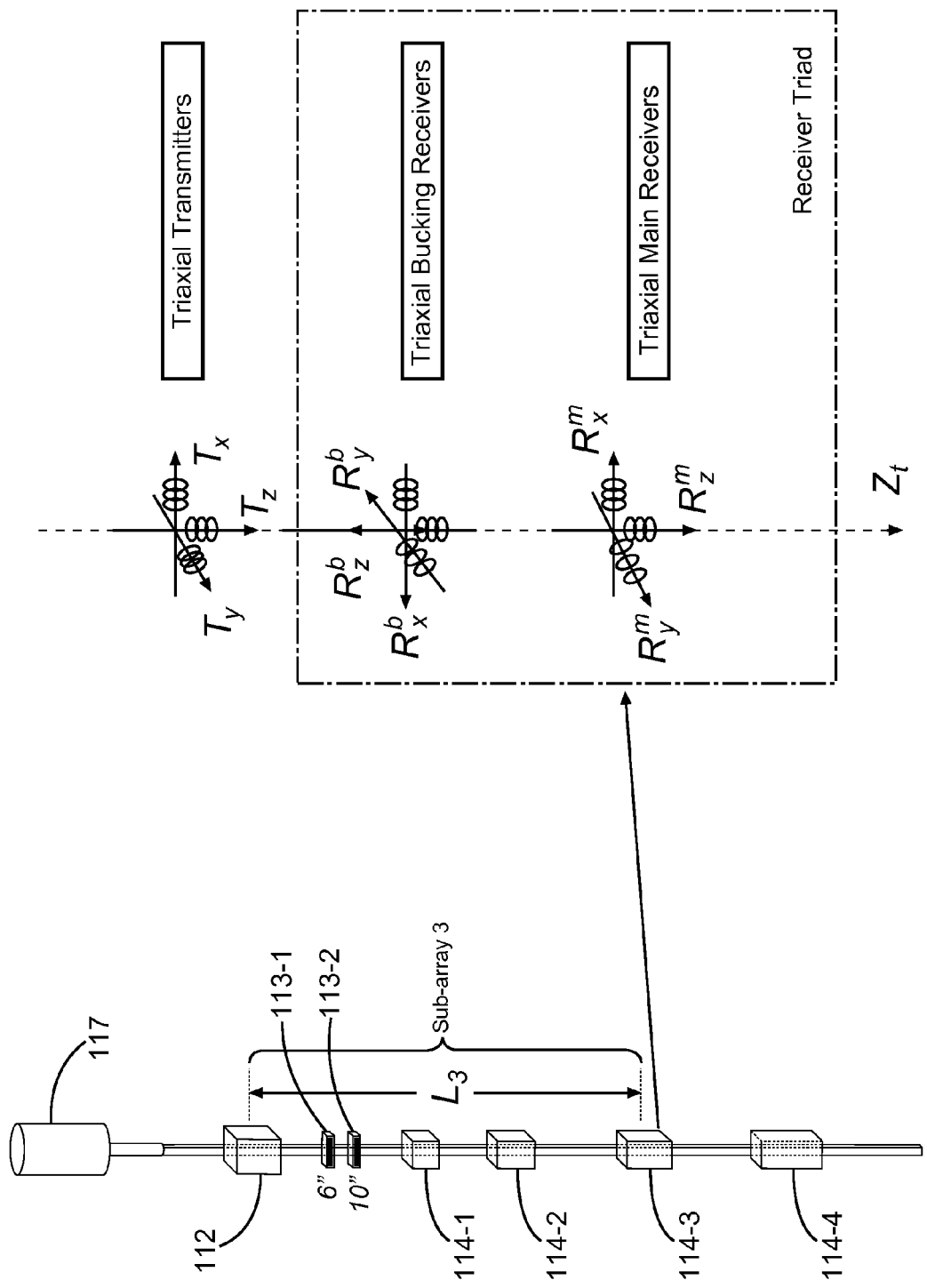

ESTIMATION OF THREE-DIMENSIONAL FORMATION USING MULTI-COMPONENT INDUCTION TOOLS

PRIORITY APPLICATIONS

This application is a U.S. National Stage Filing under 35 U.S.C. 371from International Application No. PCT/US2013/069254, filed on 8 Nov. 2013, which application is incorporated herein by reference in its entirety.

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. Measurements in a wellbore, also referred to as a borehole, are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging can utilize electromagnetic signals that can be used to make measurements. The responses from probing with electromagnetic signals can provide logs that represent measurements of one or more physical quantities in or around a well, where these measurements are a function of depth, time, or depth and time. The usefulness of such measurements may be related to the precision or quality of the information derived from such measurements. On-going efforts are being directed to improving techniques to enhance the precision or the quality of the information derived from such measurements using logging tools.

BRIEF DESCRIPTION OF THE DRAWINGS

FIG. 1A illustrates an example tool structure of a multi-component induction tool, in accordance with various embodiments.

FIG. 1B illustrates a configuration of one subarray of the multi-component induction tool of FIG. 1A, in accordance with various embodiments.

DETAILED DESCRIPTION

Figure 2A:
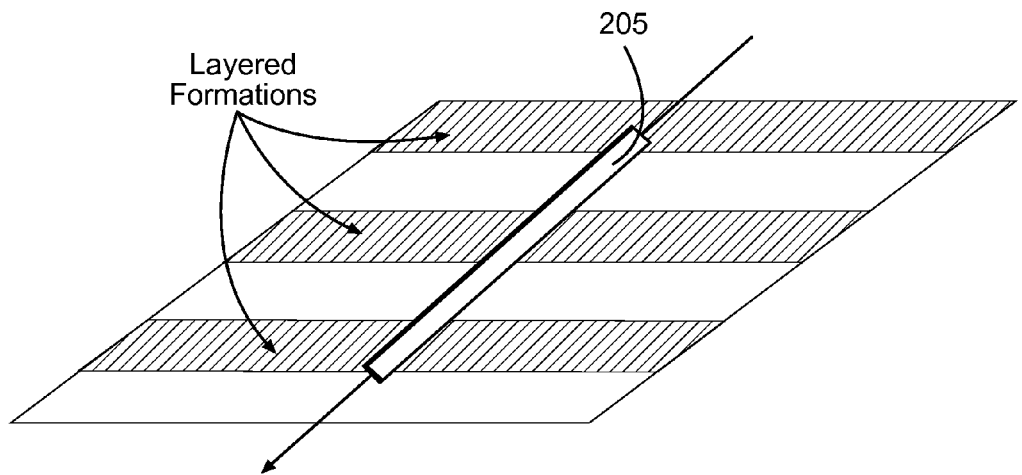
FIG. 2A shows a multi-component induction tool in a one-dimensional layered formation, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Multi-coupling-component signals of electromagnetic (EM) resistivity logging tools are widely used to explore formation parameters, such as formation anisotropy, relative dip angle, boundaries, etc. Inversion processing of data to determine formation parameters can be performed according to a modeling approach for the formation. Inversion operations can include a comparison of measurements to predictions of a model such that a value or spatial variation of a physical property can be determined. In inversion, measured data may be applied to construct a model that is consistent with the data. For examining, an inversion operation can include determining a variation of electrical conductivity in a formation from measurements of induced electric and magnetic fields. Other techniques, such as a forward model, deal with calculating expected observed values with respect to an assumed model.

In zero-dimensional (0D) inversion, there is no variation in the formation, such as in a homogenous formation. In one-dimensional (1D) modeling, there is variation in one direction such as a formation of parallel layers. In two-dimensional (2D) modeling, there is variation in two directions and, in three-dimensional (3D) modeling, there is variation in three directions. In general, a coordinate system in which the above dimensions are defined can be Cartesian or cylindrical. In borehole applications, a cylindrical coordinate system is often used.

In general, 0D inversion adopting these coupling components is attractive owing to its simplicity and fast computation. Several processing schemes have been proposed on the basis of 0D inversion using various coupling components to calculate formation parameters. Based on distinct sensitivities of these coupling components, 0D inversion is able to provide accurate inverted formation model at arbitrary wellbore inclinations, especially while the EM tool is located in a thick bed. Processing schemes have provided successful determination of anisotropy parameters, which may include horizontal resistivity, vertical resistivity, relative dip angle, and relative strike, presented by both synthetic responses and field data. A synthetic response is a modeled response of a tool with respect to known parameters of the formation to which the tool is being applied. The synthetic response can be created by numerically modeling the interaction of the tool and the formation, usually involving simulation. In a synthetic log, simulation may be conducted for each depth of the log on a point by point basis.

Multi-component/tri-axial tools have been applied to process and estimate 1D layered formations. Such multi-component/tri-axial tools can be used to estimate complex 3D formation. However, complicated and expensive 3D inversion methods are usually applied to estimate complex 3D formation properties. In various embodiments, an efficient and systematic estimation method can be implemented for the accurate prediction of complex 3D formation properties using multi-component induction tools.

FIG. 1A illustrates an example tool structure of a multi-component induction (MCI) tool. The MCI tool includes a transmitter triad 112, four receiver triads 114-1, 114-2, 114-3, and 114-4, as well as two conventional axial receivers 113-1 and 113-2. The conventional receivers are located closest to the transmitter triad. The receivers are separated from the transmitter triad. For example, one conventional axial receiver 113-1 can be separated from the transmitter triad by 6 inches and the second conventional axial receiver 113-2 can be separated from the transmitter triad 112 by 10 inches. FIG. 1A shows the receiver triad 114-3 separated from the transmitter triad by a distance $L_3$. The other receiver triads are separated from the transmitter triad by different distances. A MCI tool can be structured with a number of different sets of separation distances.

The MCI tool can include an electronic housing 117. The electronic housing 117 can include a control unit to selectively activate the transmitter triad 112 and to selectively acquire signals from the receiver triads 114-1, 114-2, 114-3, and 114-4, and the conventional axial receivers 113-1 and 113-2 in response to a probe signal transmitted from the transmitter triad 112. The electronic housing 117 can include a processing unit to operate on the received signals. The processing unit of the electronic housing 117 may also be arranged to process multi-component induction data derived from the received signals in a manner similar to or identical to techniques taught herein.

FIG. 1B illustrates a typical configuration of one subarray of the multi-component induction tool of FIG. 1A, which can be selectively controlled to acquire a response at one frequency. FIG. 1B shows an equivalent dipole model of the one subarray arranged as a triad. It can be structured with triaxial components including the three mutually orthogonal transmitters ($T_x$, $T_y$, $T_z$), the three mutually orthogonal main receivers ($R^m_x$, $R^m_y$, $R^m_z$) and three mutually orthogonal bucking/balancing receivers ($R^b_x$, $R^b_y$, $R^b_z$). The receiver triad 114-3 can include the main receivers ($R^m_x$, $R^m_y$, $R^m_z$) along with the bucking/balancing receivers ($R^b_x$, $R^b_y$, $R^b_z$). In this example, the transmitters are structured as transmitter coils that are collocated. The main receivers can be structured as receiver coils that are collocated, and the bucking receivers can be structured as receiver coils that are collocated. This tool structure enables the measurement of a nine-component voltage per frequency per triad in the logging tool's three-dimensional (3D) coordinate system at each log depth.

The measured nine-component voltages are usually expressed as a (3×3) tensor given by:

$$\overline{\overline{V}} = (V_{ij})_{(3\times3)} = \begin{pmatrix} V_{xx} & V_{xy} & V_{xz} \\ V_{yx} & V_{yy} & V_{yz} \\ V_{zx} & V_{zy} & V_{zz} \end{pmatrix}, \quad (1)$$

$$i, j = x, y, z$$

in which $V_{ij}$ is the measured-voltage coupling, where the first subscript "i" indicates the transmitter direction, and the second subscript "j" indicates the receiver direction. As in conventional induction logging, the voltages measured in the receivers coil, expressed in equation (1), can be calibrated into apparent conductivities to obtain the following apparent-conductivity tensor expression:

$$\overline{\overline{\sigma_a}} = (\sigma_{ij})_{(3\times3)} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix}, \quad (2)$$

$$i, j = x, y, z$$

$\overline{\sigma}_a$ is the MCI apparent conductivity tensor in the tool or measurement coordinate system ($x_t$, $y_t$, $z_t$) and $$\sigma_{ij} = \frac{V_{ij}}{K^V_{ij}},$$

where $K^V_{ij}$ are the calibration factors of the coupling $\sigma_{ij}$, determined by a calibration experiment. Moreover, if the MCI sensor can be approximated as a point magnetic dipole, one can set $K^V_{xx}=K^V_{yy}=K^V_{xy}=K^V_{yx}$ and $K^V_{xz}=K^V_{yz}=K^V_{zx}=K^V_{zy}$. Therefore, there should only be three independent calibration factors in this case: $K^V_{zz}$, $K^V_{xx}$, and $K^V_{xz}$ for one subarray operated at one frequency. If i, j=z, the coupling $\sigma_{ij}$ is the conventional induction measurement, which is commonly denoted as ZZ.

FIG. 2A shows a multi-component induction tool 205 in a one-dimensional (1D) layered formation. Multi-component induction tools have been widely used to solve for properties of such 1D layered formations. Relative dip (Dip), formation bed boundaries, horizontal formation resistivity (Rh) and vertical formation resistivity (Rv) can be efficiently estimated through one-dimensional numerical optimization/inversion.

Figure 2B:
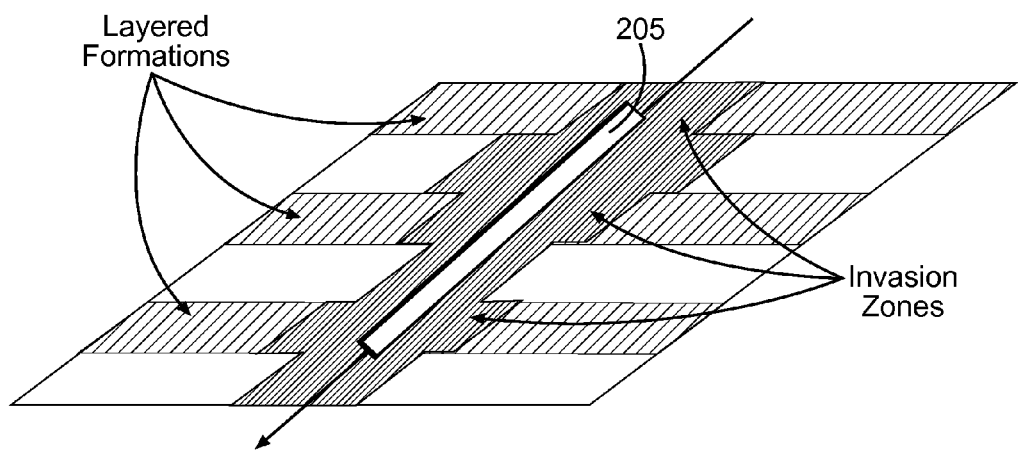
FIG. 2B shows a multi-component induction tool in a complex three-dimensional layered formation, in accordance with various embodiments.

FIG. 2B shows a multi-component induction tool 205 in a complex three-dimensional (3D) layered formation. However, when multi-component induction tools are located in a complex 3D formation, as shown in FIG. 2B in which invasion zones exist in addition to the layered formation of FIG. 2A, 1D inversion methods fail to provide good results, due to effects from invasion zones. Invasion zones are defined as regions close to the borehole wall where some of the moveable formation fluids are displaced by mud filtrate. A 3D inversion can be applied to solve for additional invasion parameters. Unfortunately, 3D inversion methods with all unknown parameters occurring at once require significant computer resources and computationally expensive.

Figure 3:
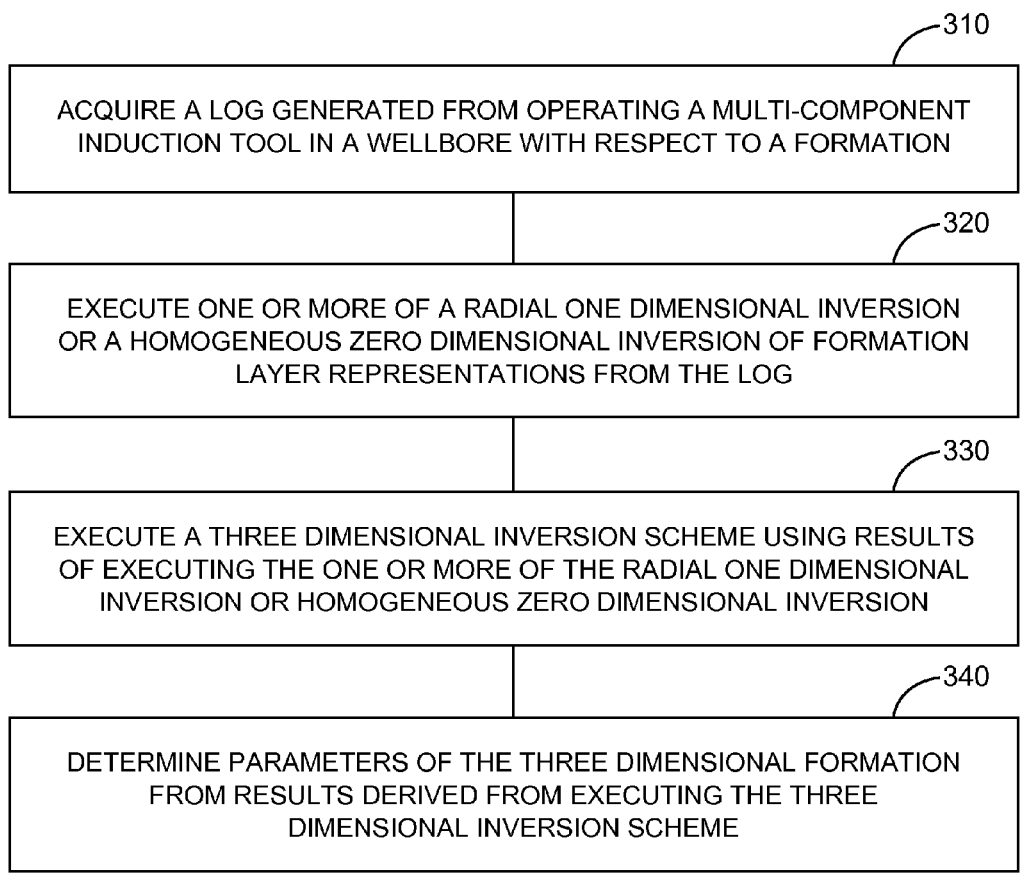
FIG. 3 shows features of an example method implementing a multi-stage inversion scheme to determine three-dimensional formation parameters using a multi-component induction tool, in accordance with various embodiments.

FIG. 3 shows features of an embodiment of an example method implementing a multi-stage inversion scheme to determine 3D formation parameters using a multi-component/tri-axial induction tool. At 310, a log generated from operating a multi-component induction tool in a wellbore with respect to a three-dimensional formation is acquired. At 320, one or more of a radial one-dimensional inversion or a homogeneous zero-dimensional inversion of formation layer representations from the log are executed. At 330, a three-dimensional inversion scheme is executed using results of executing the one or more of the radial one-dimensional inversion or homogeneous zero-dimensional inversion. At 340, parameters of the three-dimensional formation are determined from results derived from executing the three-dimensional inversion scheme. Methods can include separating the log into a number of processing windows; selecting a processing window from the number of processing windows; detecting formation boundaries in the selected processing window; selecting a layer in the selected processing window; determining whether invasion zones exist with respect to the selected layer; and executing the radial one-dimensional inversion or the homogeneous zero-dimensional inversion based on determining whether the invasion zones exist. One or more processors can be implemented to perform operations similar or identical to those taught herein. In various embodiments, a multi-stage inversion scheme, in a manner similar to or identical to schemes described herein, can be implemented to facilitate inversion and produce accurate results.

Figure 4:
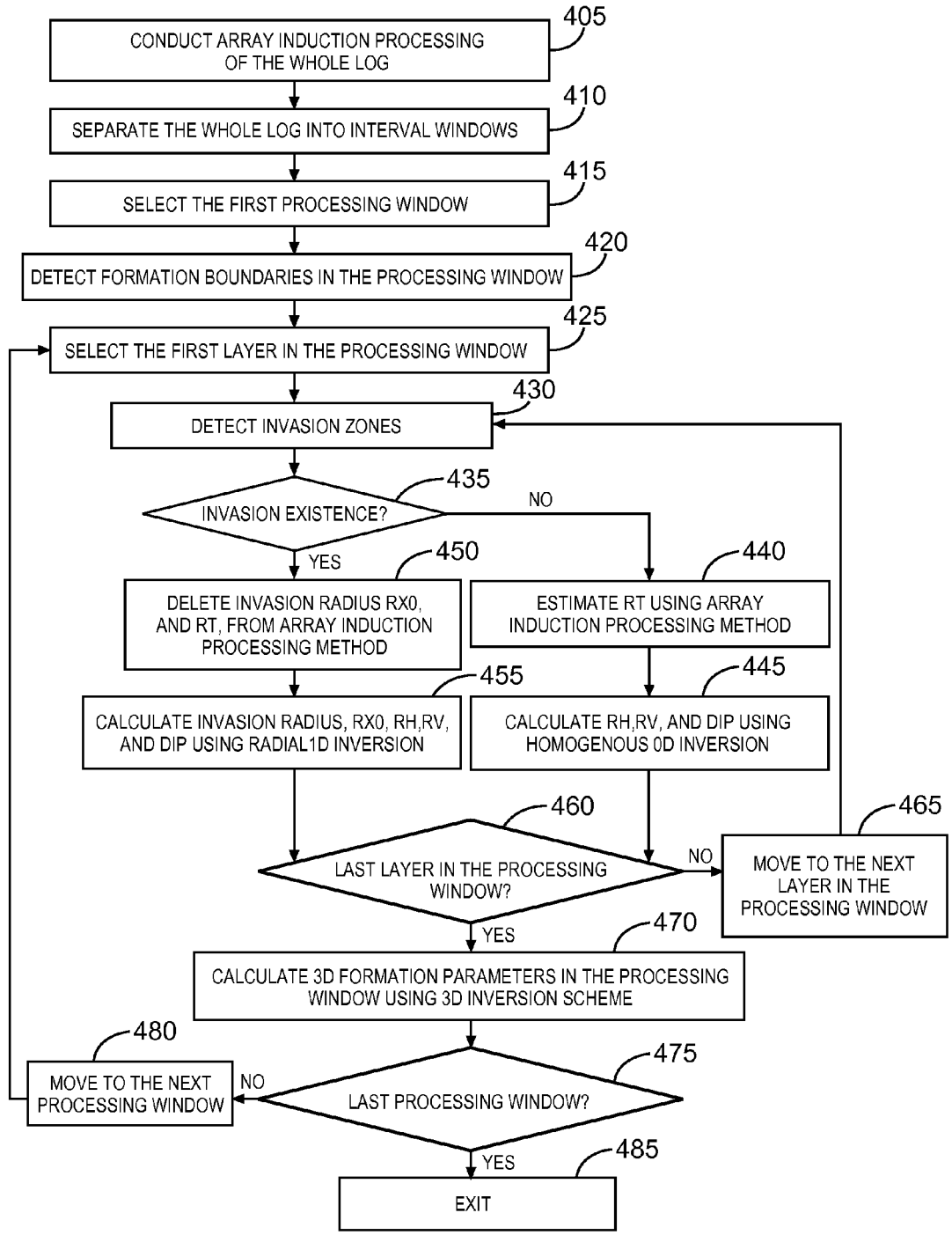
FIG. 4 illustrates an example systematic multi-stage inversion processing scheme, in accordance with various embodiments.

FIG. 4 illustrates an embodiment of an example systematic multi-stage inversion processing scheme. At 405, array induction processing is conducted with respect to a whole log. Such array induction processing can be performed using conventional array induction processing.

At 410, a whole log model is separated into a number of intervals. Since a whole log model can be extremely large, instead of processing the whole model, a series of processing on small individual windows can be more efficient. An overlapping processing window can be applied to reduce window truncation errors. At 415, a first processing window interval is selected.

At 420, formation boundaries are detected within each processing interval window. Each processing interval window can be a small interval. A variance based method can be employed. At 425, a first layer in the processing window is selected.

At 430, processing is conducted to determine whether invasion zones within the layer are detected. After detecting bed boundaries, array induction processing results at the midpoint at the selected layer is employed to detect presence of invasion zones. Such array induction processing can be implemented using conventional array induction processing to detect presence of invasion zones. Usually, conventional array induction processing can provide an accurate indication of existence of invasion zones.

At 435, a determination is made as to whether an invasion zone is present. If it is determined that an invasion is present, the processing scheme moves to 440. Otherwise, the processing scheme moves to 450. At 440, invasion radius, invasion resistivity (Rxo), and formation resistivity (Rt) are extracted. The extraction can be conducted with respect to the midpoint of the layer. Such extraction can be performed using an array induction processing method at the midpoint of the layer. Conventional array induction processing method can be applied, as in 405, to estimate invasion radius, Rxo, and Rt for the entire log region. Although conventional array induction processing methods typically do not take dip and formation anisotropy into account, numerical experiments reveal that such methods can still provide good initial values (also referred to as initial guesses) for the next inversion stage.

At 445, invasion radius, Rxo, Rh, Rv, and dip are calculated using radial 1D inversion. Using computed values from 435 as initial values, radial 1D inversion is performed to calculate invasion radius, Rxo, Rh, Rv, and dip at the middle point at the current layer. Because no initial values on Rh, Rv, and dip are given from the previous step, their initial values can be estimated by selected approximations. For example, the selected approximations can be, but are not limited to:

$R_h = R_t$
$R_v = 2.0 * R_t$
$Dip = 45°$

Radial 1D inversion can be implemented by finding a global minimum location within a look-up table, which is pre-computed as a response system to a multi-dimensional input vector, such as vector (invasion radius, Rxo, Rh, Rv, dip). The components can be arranged in the vector in a selected manner. Radial 1D inversion can also be executed by using an iterative least-square method such as Gauss-Newton like methods. Upon completion of the process at 445, the process continues at 460.

At 450, Rt is estimated. Rt may be estimated using a conventional array induction processing method. The conventional array induction processing method can be applied to quickly estimate Rt at the middle point at the current layer. Although a conventional array induction processing method does not take dip and formation anisotropy into account, numerical experiments reveal that it can still provide good initial Rh value for the next inversion stage.

At 455, Rh, Rv, and dip are calculated using homogeneous zero-dimensional (0D) inversion. Using computed values from 440 as good initial values, homogeneous 0D inversion is performed to calculate Rh, Rv, and dip at the middle point at the current layer. Since no initial values on Rh, Rv, and dip are given from the previous step, their initial values can be estimated by selected approximations. For instance, the selected approximations can be, but are not limited to:

$R_h = R_t$
$R_v = 2.0 * R_t$
$Dip = 45°$

Homogeneous 0D inversion can be implemented by finding a global minimum location within a look-up table, which is pre-computed as a response system to a multi-dimensional input vector, such as vector (Rh, Rv, dip). The components can be arranged in the vector in a selected manner. Homogeneous 0D inversion can also be executed by using an iterative least-square method such as Gauss-Newton like methods. Upon completion of the process at 450, the process continues at 460.

At 460, a determination is made as to whether the current layer is the last layer in the current processing window interval. If the current layer is not the last layer in the current processing window interval, processing of the next layer in the current processing window, at 465, begins and processing is conducted to determine whether invasion zones within this next layer are detected at 430, followed by continuing the procedure from 430 to 460. If the current layer is the last layer in the current processing window interval, processing of layers of the current processing window interval can be completed with processing parameters at 470.

At 470, 3D formation parameters are calculated within each processing window using a 3D inversion scheme. After obtaining formation parameters from radial 1D inversion and/or homogeneous 0D inversion, a 3D inversion scheme is conducted to refine these parameters and the formation bed boundaries as well. In the 3D inversion scheme, the most time-consuming part is the computation of the Jacobian matrix, where a 3D forward modeling is performed many times in one iterative step. In various embodiments, one of more the following approaches can be employed to accelerate Jacobian matrix computation in the 3D inversion.

In one approach, a secant update of the Jacobian matrix can be employed. The Jacobian matrix can be calculated using 3D forward modeling in a first iteration procedure. Next, a Jacobian matrix is computed by secant update, without resorting to 3D forward modeling that can be expensive in terms of time and/or computing resources. Whenever the Jacobian matrix cannot enable convergence of inversion, which may be viewed as the Jacobian matrix not being able to provide a downhill direction for inversion, 3D forward modeling can be used to compute a Jacobian matrix via a finite-difference formula.

In another approach, relatively coarser mesh can be used in 3D forward modeling. In addition, relatively higher tolerance can be used to terminate matrix solution required by 3D forward modeling.

In another approach, various parallel computing techniques can be applied to speed up 3D forward modeling or Jacobian matrix simulation. These techniques can include, but are not limited to, message passing interface (MPI), open multi-processing (OPENMP), portable operating system interface (POSIX) threads (PTHREADS), and general-purpose computing on graphics processing units (GPGPU). If a computer cluster/a computer farm is available, MPI may be a preferred method. If a computer with multi processors is available, OPENMP or PTHREADS may be a preferred method. If a computer is equipped with a powerful video card, GPGPU may be an optimal choice for inversion parallelization. In addition, these parallel computing techniques can be integrated together. For example, if multiple multi-core/multi-processor computers are available, MPI+OPENMP or MPI+PTHREADS can be employed to achieve better computing performance.

At 470, a determination is made as to whether the current window is the last window. If the current window is not the last window interval, processing of the next processing window, at 480, begins and processing is conducted to select a first layer in this next processing window at 425, followed by continuing the procedure from 425 to 475. If the current window is the last window interval, the systematic multi-stage inversion processing scheme can complete at 485.

In various embodiments, a machine-readable storage device can comprise instructions stored thereon, which, when performed by a machine, cause the machine to perform operations, the operations comprising one or more features similar to or identical to features of methods and techniques described herein. The physical structure of such instructions may be operated on by one or more processors. Executing these physical structures can cause the machine to perform operations to acquire a log generated from operating a multi-component induction tool in a wellbore with respect to a three-dimensional formation; to execute one or more of a radial one-dimensional inversion or a homogeneous zero-dimensional inversion of formation layer representations from the log; to execute a three-dimensional inversion scheme using results of executing the one or more of the radial one-dimensional inversion or homogeneous zero-dimensional inversion; and to determine parameters of the three-dimensional formation from results derived from executing the three-dimensional inversion scheme. The instructions can include instructions to separate the log into a number of processing windows; to select a processing window from the number of processing windows; to detect formation boundaries in the selected processing window; to select a layer in the selected processing window; to determine whether invasion zones exist with respect to the selected layer; and to execute the radial one-dimensional inversion or the homogeneous zero-dimensional inversion based on determining whether the invasion zones exist. The instructions can include instructions to operate multi-component induction tool having one or more transmitters and one or more receivers to provide data to a processing unit in accordance with the teachings herein. Further, a machine-readable storage device, herein, is a physical device that stores data represented by physical structure within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise a tool structure and a processing unit to process data from operating the tool structure. The tool structure can be a multi-component induction tool structure having a transmitter array and a plurality of receiver arrays, where the multi-component induction tool structure is capable of operating in a wellbore. The multi-component induction tool can include the plurality of receiver arrays structured with coils arranged in a plurality of receiver triads disposed axially on the multi-component induction tool and the transmitter array structured with coils arranged in a transmitter triad disposed axially on the multi-component induction tool, where the receiver triads are at different distances from the transmitter triad. The processing unit can be structured: to acquire a log generated from operation of the multi-component induction tool in a wellbore with respect to a three-dimensional formation; to execute one or more of a radial one-dimensional inversion or a homogeneous zero-dimensional inversion of formation layer representations from the log; to execute a three-dimensional inversion scheme using results of execution of the one or more of the radial one-dimensional inversion or homogeneous zero-dimensional inversion; and to determine parameters of the three-dimensional formation from results derived from execution of the three-dimensional inversion scheme. The processing unit can be further structured: to separate the log into a number of processing windows; to select a processing window from the number of processing windows; to detect formation boundaries in the selected processing window; to select a layer in the selected processing window; to determine whether invasion zones exist with respect to the selected layer; and to execute the radial one-dimensional inversion or the homogeneous zero-dimensional inversion based on determination of whether the invasion zones exist.

The processing unit can be structured to perform processing techniques similar to or identical to the techniques discussed herein. The processing unit may control selective activation of the transmitters and acquisition of signals from the receivers. Alternatively, a control unit can be used to control and manage the transmitters and receivers. The processing unit can be configured to process the acquired signals and process data related to or generated from the acquired signals. The processing unit may be arranged as an integrated unit or a distributed unit. The processing unit can be disposed at the surface of a wellbore to process multi-component induction data from operating the tool structure downhole. The processing unit be disposed in a housing unit integrated with the tool structure or arranged downhole in the vicinity of the tool structure.

Figure 5:
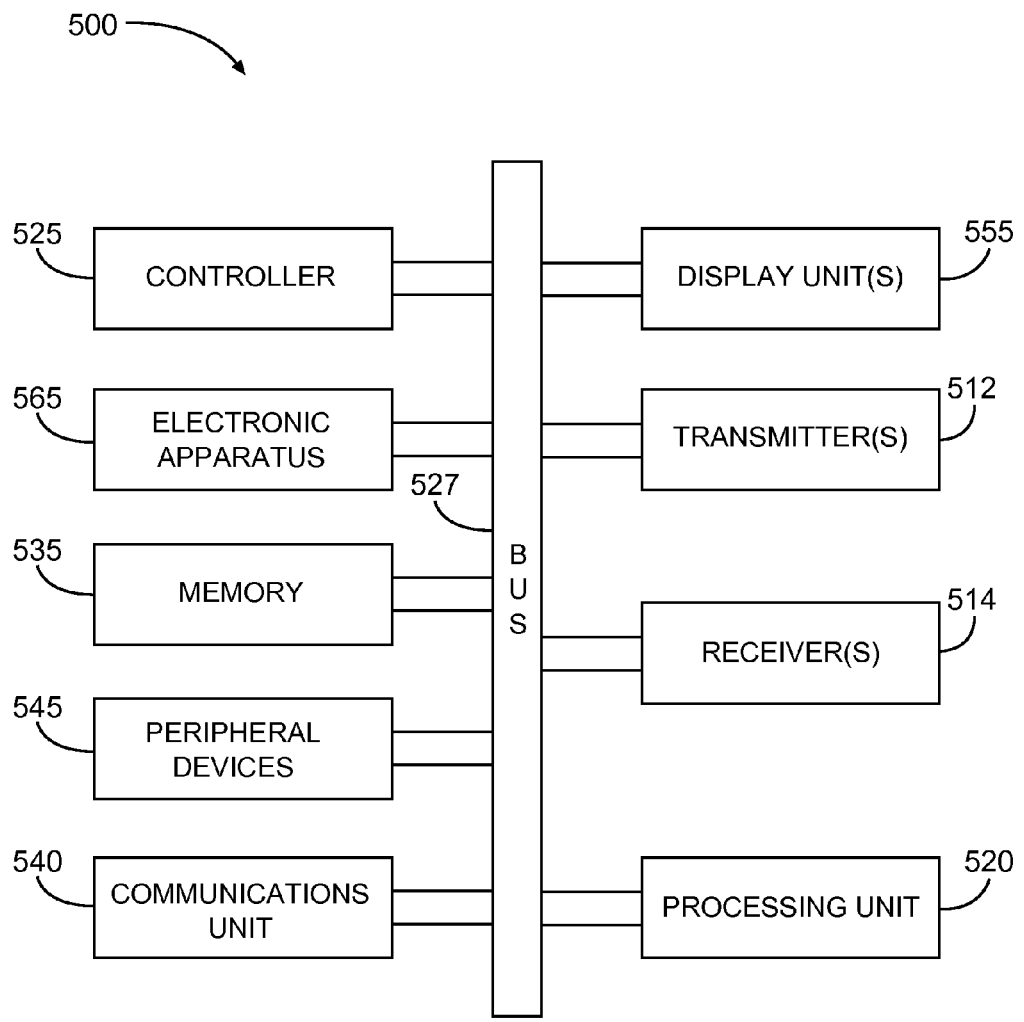
FIG. 5 depicts a block diagram of features of an example system operable to control a multi-component induction tool to conduct measurements in a wellbore and to implement a multi-stage inversion scheme to determine three-dimensional formation parameters, in accordance with various embodiments.

FIG. 5 depicts a block diagram of features of an embodiment of an example system 500 operable to control a multi-component induction tool to conduct measurements in a wellbore and to implement a multi-stage inversion scheme to determine 3D formation parameters using data derived from operating the multi-component induction tool. The system 500 includes a tool structure 505 having an arrangement of transmitter antenna(s) 512 and receiver antenna(s) 514 operable in a wellbore. The arrangements of the transmitter antenna(s) 512 and the receiver antenna(s) 514 of the tool structure 505 can be realized similar to or identical to arrangements discussed herein. The system 500 can also include a controller 525, a memory 535, an electronic apparatus 565, and a communications unit 540. The controller 525 and the memory 535 can be arranged to operate the tool structure 505 to acquire measurement data as the tool structure 505 is operated. The controller 525 and the memory 535 can be realized to control activation of selected ones of the transmitter antennas 512 and data acquisition by selected one of the receiver antennas 514 in the tool structure 505 and to manage processing schemes with respect to data derivable from measurements using tool structure 505 as described herein. Processing unit 520 can be structured to perform the operations to manage processing schemes implementing a multi-stage inversion scheme in a manner similar to or identical to embodiments described herein.

Electronic apparatus 565 can be used in conjunction with the controller 525 to perform tasks associated with taking measurements downhole with the transmitter antenna(s) 514 and the receiver antenna(s) 512 of the tool structure 505. The communications unit 540 can include downhole communications in a drilling operation. Such downhole communications can include a telemetry system.

The system 500 can also include a bus 527, where the bus 527 provides electrical conductivity among the components of the system 500. The bus 527 can include an address bus, a data bus, and a control bus, each independently configured. The bus 527 can also use common conductive lines for providing one or more of address, data, or control, the use of which can be regulated by the controller 525. The bus 527 can be configured such that the components of the system 500 are distributed. Such distribution can be arranged between downhole components such as the transmitter antenna(s) 512 and the receiver antenna(s) 514 of the tool structure 505 and components that can be disposed on the surface of a well. Alternatively, various of these components can be co-located such as on one or more collars of a drill string or on a wireline structure.

In various embodiments, peripheral devices 545 can include displays, additional storage memory, and/or other control devices that may operate in conjunction with the controller 525 and/or the memory 535. In an embodiment, the controller 525 can be realized as one or more processors. The peripheral devices 545 can be arranged to operate in conjunction with display unit(s) 555 with instructions stored in the memory 535 to implement a user interface to manage the operation of the tool structure 505 and/or components distributed within the system 500. Such a user interface can be operated in conjunction with the communications unit 540 and the bus 527. Various components of the system 500 can be integrated with the tool structure 505 such that processing identical to or similar to the processing schemes discussed with respect to various embodiments herein can be performed downhole in the vicinity of the measurement or at the surface.

Figure 6:
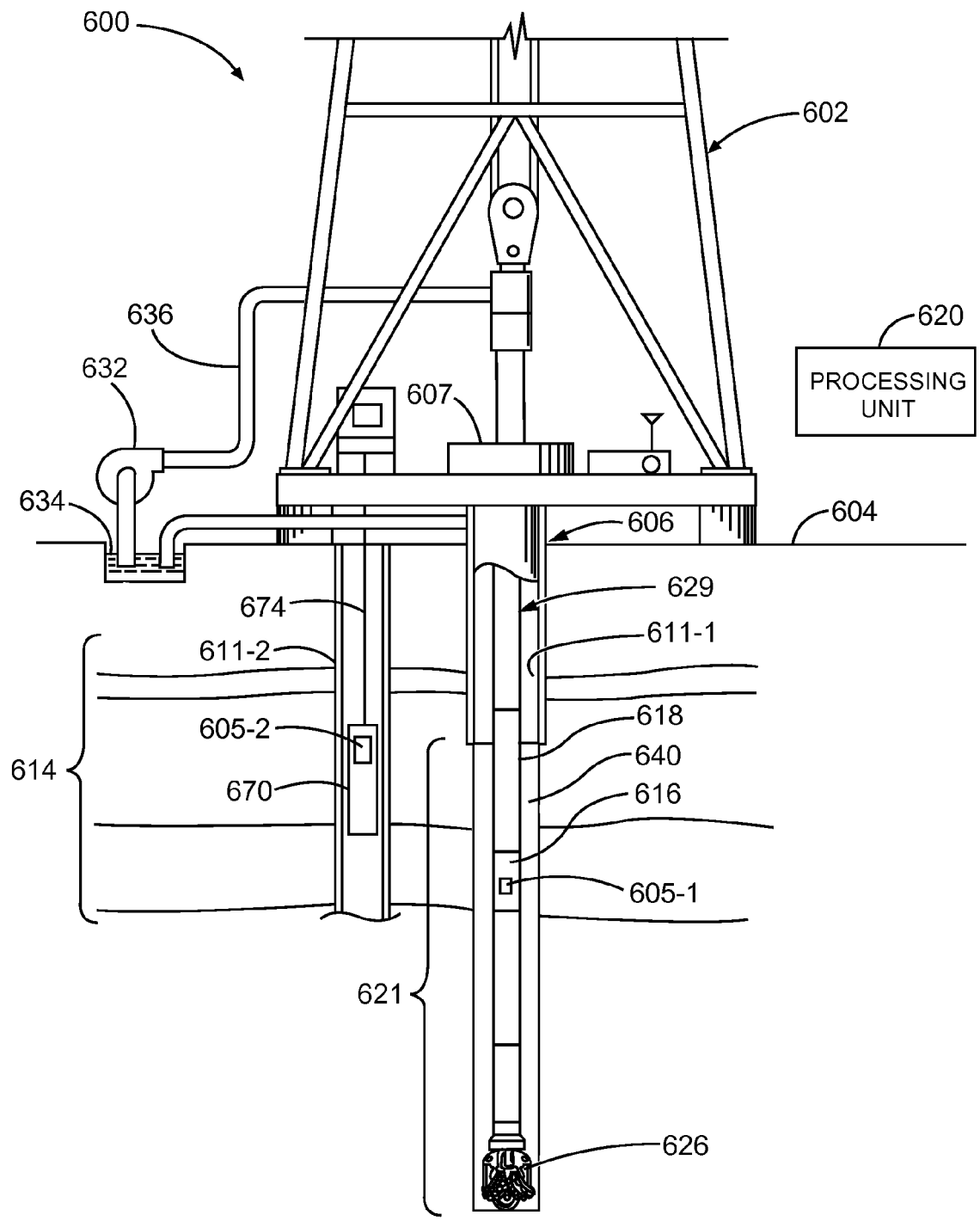
FIG. 6 depicts an example system at a drilling site, where the system is operable to control a multi-component induction tool to conduct measurements in a wellbore and to implement a multi-stage inversion scheme to determine 3D formation parameters, in accordance with various embodiments.

FIG. 6 depicts an embodiment of a system 600 at a drilling site, where the system 600 includes an apparatus operable to control a multi-component induction tool to conduct measurements in a wellbore and to implement a multi-stage inversion scheme to determine 3D formation parameters using data derived from operating the multi-component induction tool. The system 600 can include a tool 605-1, 605-2, or both 605-1 and 605-2 having an arrangement of transmitter antennas and receiver antennas operable to make measurements that can be used for a number of drilling tasks including, but not limited to, processing multi-component induction data. The tools 605-1 and 605-2 can be structured identical to or similar to a tool architecture or combinations of tool architectures discussed herein, including control units and processing units operable to perform processing schemes in a manner identical to or similar to processing techniques discussed herein. The tools 605-1, 605-2, or both 605-1 and 605-2 can be distributed among the components of system 600. The tools 605-1 and 605-2 can be realized in a similar or identical manner to arrangements of control units, transmitters, receivers, and processing units discussed herein. The tools 605-1 and 605-2 can be structured and fabricated in accordance with various embodiments as taught herein.

The system 600 can include a drilling rig 602 located at a surface 604 of a well 606 and a string of drill pipes, that is, drill string 629, connected together so as to form a drilling string that is lowered through a rotary table 607 into a wellbore or borehole 611-1. The drilling rig 602 can provide support for the drill string 629. The drill string 629 can operate to penetrate rotary table 607 for drilling the borehole 611-1 through subsurface formations 614. The drill string 629 can include a drill pipe 618 and a bottom hole assembly 621 located at the lower portion of the drill pipe 618.

The bottom hole assembly 621 can include a drill collar 616 and a drill bit 626. The drill bit 626 can operate to create the borehole 611-1 by penetrating the surface 604 and the subsurface formations 614. The bottom hole assembly 621 can include the tool 605-1 attached to the drill collar 616 to conduct measurements to determine formation parameters. The tool 605-1 can be structured for an implementation as a MWD system such as a LWD system. The housing containing the tool 605-1 can include electronics to initiate measurements from selected transmitter antennas and to collect measurement signals from selected receiver antennas. Such electronics can include a processing unit to provide analysis of multi-component induction data over a standard communication mechanism for operating in a well. Alternatively, electronics can include a communications interface to provide measurement signals collected by the tool 605-1 to the surface over a standard communication mechanism for operating in a well, where these measurements signals can be analyzed at a processing unit 620 at the surface to provide analysis of multi-component induction data.

During drilling operations, the drill string 629 can be rotated by the rotary table 607. In addition to, or alternatively, the bottom hole assembly 621 can also be rotated by a motor (e.g., a mud motor) that is located downhole. The drill collars 616 can be used to add weight to the drill bit 626. The drill collars 616 also can stiffen the bottom hole assembly 621 to allow the bottom hole assembly 621 to transfer the added weight to the drill bit 626, and in turn, assist the drill bit 626 in penetrating the surface 604 and the subsurface formations 614.

During drilling operations, a mud pump 632 can pump drilling fluid (sometimes known by those of skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 611-1. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation cuttings created by operating the drill bit 626.

In various embodiments, the tool 605-2 may be included in a tool body 670 coupled to a logging cable 674 such as, for example, for wireline applications. The tool body 670 containing the tool 605-2 can include electronics to initiate measurements from selected transmitter antennas and to collect measurement signals from selected receiver antennas. Such electronics can include a processing unit to provide analysis of multi-component induction data over a standard communication mechanism for operating in a well. Alternatively, electronics can include a communications interface to provide measurement signals collected by the tool 605-2 to the surface over a standard communication mechanism for operating in a well, where these measurements signals can be analyzed at a processing unit 620 at the surface to provide analysis of multi-component induction data. The logging cable 674 may be realized as a wireline (multiple power and communication lines), a mono-cable (a single conductor), and/or a slick-line (no conductors for power or communications), or other appropriate structure for use in the borehole 611-2. Though FIG. 6 depicts both an arrangement for wireline applications and an arrangement for LWD applications, the system 600 may be also structured to provide one of the two applications.

In various embodiments, apparatus and processing techniques can provide computation of complex 3D formation parameters using multi-component/tri-axial induction tools. The processing techniques can include several inversion stages, which allow the processing techniques to efficiently produce accurate processing results in the computation of 3D formation properties for the multi-component induction tool. Radial 1D and homogeneous 0D inversions can be applied to quickly and efficiently estimate formation properties to be used as good initial values for 3D inversion. Additional low-dimensional and low-cost inversion processing can be conducted first to estimate invasion radius, invasion resistivity, and formation resistivity. These accurately estimated values are then used as initial guess values in a 3D inversion scheme to significantly accelerate inversion convergence. 3D inversion schemes can include efficient Jacobian matrix computation approaches to speed up 3D inversion.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for determining formation parameters of a three-dimensional formation, said method comprising:
    disposing a multi-component induction tool into a wellbore disposed in the three-dimensional formation, the multi-component induction tool having a transmitter array and a plurality of receivers;
    activating the transmitter array of the multi-component induction tool, wherein in response to the activation, the transmitter array produces a first signal;
    acquiring second signals via the plurality of receivers in response to the first signal;
    generating a log based on the second signals;
    separating the log into a number of processing windows;
    selecting a processing window from the number of processing windows;
    detecting formation boundaries in the selected processing window;
    selecting a layer in the selected processing window;
    determining whether invasion zones exist with respect to the selected layer;
    executing, based on said determining whether the invasion zones exist with respect to the selected layer, one or more of a radial one-dimensional inversion or a homogeneous zero-dimensional inversion of formation layer representations from the log;
    executing a three-dimensional inversion scheme using results of executing the one or more of the radial one-dimensional inversion or homogeneous zero-dimensional inversion; and
    determining formation parameters of the three-dimensional formation from results derived from executing the three-dimensional inversion scheme.

2. The method of claim 1, wherein executing the radial one-dimensional inversion includes calculating invasion radius, invasion resistivity, horizontal formation resistivity, vertical formation resistivity, and dip using values of invasion radius, invasion resistivity, and formation resistivity extracted from array induction processing with respect to the selected layer.

3. The method of claim 1, wherein executing the homogeneous zero-dimensional inversion includes calculating horizontal formation resistivity, vertical formation resistivity, and dip using values of formation resistivity extracted from array induction processing with respect to the selected layer.

4. The method of claim 1, wherein executing the three-dimensional inversion scheme includes executing a Jacobian matrix computation.

5. The method of claim 4, wherein executing the Jacobian matrix computation includes a secant update of the Jacobian matrix.

6. The method of claim 5, wherein executing the Jacobian matrix computation includes calculating the Jacobian matrix using three-dimensional forward modeling in a first iteration.

7. The method of claim 6, wherein secant update of the Jacobian matrix includes computing the Jacobian matrix by secant update, without using a three-dimensional forward modeling.

8. The method of claim 4, wherein executing the Jacobian matrix computation includes using one or more parallel computing techniques.

9. The method of claim 8, wherein using one or more parallel computing techniques includes using one or more of message passing interface (MPI), open multi-processing (OPENMP), portable operating system interface threads (PTHREADS), and general-purpose computing on graphics processing units (GPGPU).

10. The method of claim 1, wherein activating the transmitter array of the multi-component induction tool comprises activating a transmitter triad disposed axially on the multi-component induction tool, and wherein acquiring the second signals via the plurality of receivers comprises acquiring the second signals via at least one of a plurality of receiver triads disposed axially on the multi-component induction tool, the receiver triads at different distances from the transmitter triad.

11. A non-transitory machine-readable storage device having instructions stored thereon for determining formation parameters of a three-dimensional formation, which, when performed by a machine, cause the machine to perform operations, the operations comprising:
   acquiring a log generated from operating a multi-component induction tool in a wellbore with respect to a three-dimensional formation, the multi-component induction tool having a transmitter array and a plurality of receivers, wherein the log is generated based on transmission of a first signal by the transmitter array and reception of second signals via the plurality of receivers in response to the first signal;
   separating the log into a number of processing windows;
   selecting a processing window from the number of processing windows;
   detecting formation boundaries in the selected processing window;
   selecting a layer in the selected processing window;
   determining whether invasion zones exist with respect to the selected layer;
   executing, based on said determining whether the invasion zones exist with respect to the selected layer, one or more of a radial one-dimensional inversion or a homogeneous zero-dimensional inversion of formation layer representations from the log;
   executing a three-dimensional inversion scheme using results of executing the one or more of the radial one-dimensional inversion or homogeneous zero-dimensional inversion; and
   determining formation parameters of the three-dimensional formation from results derived from executing the three-dimensional inversion scheme.

12. The machine-readable storage device of claim 11, wherein executing the radial one-dimensional inversion includes calculating invasion radius, invasion resistivity, horizontal formation resistivity, vertical formation resistivity, and dip using values of invasion radius, invasion resistivity, and formation resistivity extracted from array induction processing with respect to the selected layer.

13. The machine-readable storage device of claim 11, wherein executing the homogeneous zero-dimensional inversion includes calculating horizontal formation resistivity, vertical formation resistivity, and dip using values of formation resistivity extracted from array induction processing with respect to the selected layer.

14. The machine-readable storage device of claim 11, wherein executing the three-dimensional inversion scheme includes executing a Jacobian matrix computation.

15. The machine-readable storage device of claim 14, wherein executing the Jacobian matrix computation includes a secant update of the Jacobian matrix.

16. The machine-readable storage device of claim 15, wherein executing the Jacobian matrix computation includes calculating the Jacobian matrix using three-dimensional forward modeling in a first iteration.

17. The machine-readable storage device of claim 16, wherein secant update of the Jacobian matrix includes computing the Jacobian matrix by secant update, without using a three-dimensional forward modeling.

18. The machine-readable storage device of claim 14, wherein executing the Jacobian matrix computation includes using one or more parallel computing techniques.

19. The machine-readable storage device of claim 18, wherein using one or more parallel computing techniques includes using one or more of message passing interface (MPI), open multi-processing (OPENMP), portable operating system interface threads (PTHREADS), and general-purpose computing on graphics processing units (GPGPU).

20. The machine-readable storage device of claim 11, wherein operating the multi-component induction tool includes acquiring signals from a plurality of receiver triads disposed axially on the multi-component induction tool in response to a transmitter triad disposed axially on the multi-component induction tool generating probe signals, the receiver triads at different distances from the transmitter triad.

21. A system for determining formation parameters of a three-dimensional formation, said system comprising:
   a multi-component induction tool having a transmitter array and a plurality of receiver arrays to generate a log of the three-dimensional formation during operation of the multi-component induction tool; and
   a processing unit structured to:
      acquire the log generated from operation of the multi-component induction tool with respect to the three-dimensional formation;
      separate the log into a number of processing windows;
      select a processing window from the number of processing windows;
      detect formation boundaries in the selected processing window;
      select a layer in the selected processing window;
      determine whether invasion zones exist with respect to the selected layer;
      execute, based on said determining whether the invasion zones exist with respect to the selected layer, one or more of a radial one-dimensional inversion or a homogeneous zero- dimensional inversion of formation layer representations from the log;
      execute a three-dimensional inversion scheme using results of execution of the one or more of the radial one-dimensional inversion or homogeneous zero-dimensional inversion; and
      determine formation parameters of the three-dimensional formation from results derived from execution of the three-dimensional inversion scheme.

22. The system of claim 21, wherein execution of the radial one-dimensional inversion includes calculation of invasion radius, invasion resistivity, horizontal formation resistivity, vertical formation resistivity, and dip using values of invasion radius, invasion resistivity, and formation resistivity from extraction by an array induction process with respect to the selected layer.

23. The system of claim 21, wherein execution of the homogeneous zero-dimensional inversion includes calculation of horizontal formation resistivity, vertical formation resistivity, and dip using values of formation resistivity from extraction by an array induction processing with respect to the selected layer.

24. The system of claim 21, wherein execution of the three-dimensional inversion scheme includes execution of a Jacobian matrix computation.

25. The system of claim 24, wherein execution of the Jacobian matrix computation includes a secant update of the Jacobian matrix.

26. The system of claim 25, wherein execution of the Jacobian matrix computation includes calculation of the Jacobian matrix by use of a three-dimensional forward model in a first iteration.

27. The system of claim 26, wherein secant update of the Jacobian matrix includes computation of the Jacobian matrix by secant update, without use of a three-dimensional forward model.

28. The system of claim 24, wherein execution of the Jacobian matrix computation includes use of one or more parallel computing techniques.

29. The system of claim 28, wherein the one or more parallel computing techniques includes one or more of message passing interface (MPI), open multi-processing (OPENMP), portable operating system interface threads (PTHREADS), and general-purpose computing on graphics processing units (GPGPU).

30. The system of claim 21, wherein the plurality of receiver arrays includes coils arranged in a plurality of receiver triads disposed axially on the multi-component induction tool, wherein the transmitter array includes coils arranged in a transmitter triad disposed axially on the multi-component induction tool, the receiver triads at different distances from the transmitter triad, wherein the transmitter array produces a first signal in response to activation, and wherein the receiver triads acquire second signals in response to the first signal.

31. The system of claim 30, wherein a receiver triad of the plurality of receiver triads includes three mutually orthogonal main receivers and three mutually orthogonal bucking receivers.

32. The system of claim 21, wherein the multi-component induction tool includes a control unit configured to selectively activate the transmitter array and to selectively acquire signals from the plurality of receiver arrays.

33. The system of claim 21, further comprising:
   a drill string having a drill collar; wherein the multi-component induction tool is coupled to the drill collar.

* * * * *